United States Patent [19]

DeMaggio

[11] 4,163,200

[45] Jul. 31, 1979

[54] LASER BEAM ARRANGEMENT

[76] Inventor: John M. DeMaggio, 117-14 125th St., S. Ozone Park, N.Y. 11420

[21] Appl. No.: 814,672

[22] Filed: Jul. 11, 1977

[51] Int. Cl.² ............................................... H01S 3/08
[52] U.S. Cl. ............................................... 331/94.5 C
[58] Field of Search ...................... 331/94.5 C, 94.5 D

[56] References Cited

U.S. PATENT DOCUMENTS

| 3,680,000 | 7/1972 | Chesler | 331/94.5 C |
| 3,825,856 | 7/1974 | Pezot | 331/94.5 C |

Primary Examiner—William L. Sikes

Attorney, Agent, or Firm—Bertram Frank

[57] ABSTRACT

The essence of the invention resides in the creation of a laser beam of a flat planar cross section. This function is accomplished by providing a dual surface concave lens and two parabolic reflection mirrors having predetermined focal points in a laser medium within a generally cylindrical tube. The tube is provided with a mirror at each end thereof and a lens having two concave surfaces is disposed in the approximate center of the tube. A medium is provided within the tube which permits the transmission of the laser beam therein and excitation means in communication with said medium for exciting the same.

4 Claims, 1 Drawing Figure

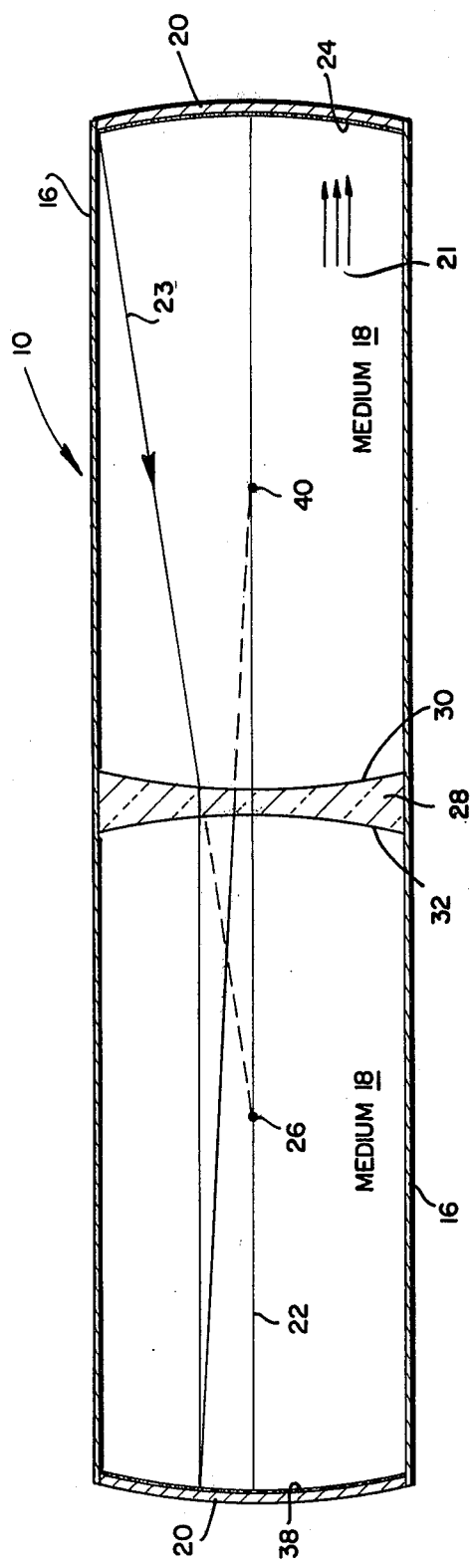

LASER BEAM ARRANGEMENT

BACKGROUND OF THE INVENTION

The invention relates to a method and apparatus for creating a flat planar laser beam.

Heretofore, it has been well known in the laser art to produce a cylindrically shaped laser beam which may be used for various physical functions. The formation of the laser beam is quite well known; however, it has been considered desirable to obtain a thin flat laser beam of a planar nature to accomplish certain functions not available with cylindrically shaped beams with a minimum of structural changes to existing laser structures. I am not aware of any present method or apparatus for creating a flat planar shaped laser beam. Therefore, the functions and desired results of a planar laser beam have not been obtained.

The use of lenses in laser beam structures is relatively new. The current use of lenses in laser beam structures is epitomized by the disclosure in U.S. Pat. No. 3,825,856, issued July 23, 1974 to Jacques Pezot in which an arrangement of lenses is used to select the Gaussian mode of operation of a laser beam. This patent utilizes lens configurations for altering the diameter of a laser beam thereby obtaining varying energy concentrations. Flat end mirrors are utilized for reflective purposes in some circumstances with convergent and divergent lenses to eliminate the high and low ends of the Gaussian curve of energy distribution to obtain a minimal dispersion through a small apertured diaphragm. This prior art reference does not speak in terms of obtaining planar laser beams and does not concern itself with the propagation of a flat planar laser beam.

In fact, the Pezot reference does not refer to focal point coincidence in any respect either for the purpose of beam concentration from large diameter to small diameter or for the creation of a flat planar laser beam in any respect.

More specifically Pezot speaks in terms of convergent lens system as a means of compensating for the optical selecting system. This teaching is diametrically opposed to the parallelism sought in the present invention.

Another prior art problem which the present invention obviates is that of beam dispersion over long distance transmission. In a recent development of the space program a regular cylindrical laser beam transmitted to the moon wound up with a four (4) mile dispersion pattern. If a flat planar laser light were transmitted at least in one plane the dispersion pattern would be minimal so that all the advantages that laser light concentration offers could be utilized.

OBJECTS OF THE PRESENT INVENTION

It is the general object of the present invention to provide a method and apparatus for the production of a flat planar laser beam in an inexpensive and expeditious manner.

A further object of the present invention is to create a flat planar beam with a minimum loss of energy.

Another object of the present invention is to permit a planar laser beam to be emitted and transmitted from a laser arrangement to accomplish functions provided by a planar beam which cannot be accomplished by a cylindrical laser beam.

Still another object of the present invention is to provide laser light with a minimum dispersion pattern in at least one plane, when transmitted over long distances.

Yet another object of the present invention is to utilize a normal laser producing apparatus with relatively inexpensive modifications which will result in the production of a planar laser beam from a laser structure which formerly produced cylindrically shaped laser beams.

SUMMARY OF THE INVENTION

The objects of the present invention and other objects which will become apparent as the description proceeds are achieved by providing a laser medium housing having at each of its ends a converging mirror. Each of said mirrors has a focal point spaced at least half the length of the laser structure therefrom. The laser structure further includes a concave lens so disposed between the converging mirrors that a beam will be directed from the surface of a converging mirror at one end of the laser structure to the concave lens and thereafter to the converging mirror at the other end of the laser structure changing the overall cross-sectional configuration of the propagated light.

DESCRIPTION OF THE INVENTION

For a better understanding of the present invention reference should be had to the accompanying sole FIGURE of the drawings which is a schematic representation of the laser arrangement.

DESCRIPTION OF THE PREFERRED EMBODIMENT

The laser arrangement which is generally a well known structure is shown in the sole FIGURE and is generally identified by the reference numeral 10. Light rays are produced in a well known manner via an excitation means disposed within a cylindrical tube 16. A medium 18 is provided within the tube 16 which is used to produce the laser light. The light rays produced are parallel to the center axis of the tubular portion 16 of the laser arrangement. A converging mirror 20 is provided at each end of the tubular section 16 of the laser arrangement 10. Light rays 21 are induced in the medium 18 parallel to the center axis 22. Such light rays 21 will impinge upon the first converging mirror 24 and the reflected beams 23 will be directed towards the first converging mirror's focal point 26, which is remote therefrom. In order to reach such focal point 26, the beam 23 must pass through a diverging lens 28 having its surfaces 30, 32 concave facing respectively the mirrored ends 20 of the tubular portion 16 of the laser arrangement 10. The purpose of this structure will be more fully explained as the description proceeds.

As shown in FIG. 1, the light beam 23 being reflected from the first mirror 24 will be directed toward the focal point 26 of the first mirror 24 which focal point is more than half-way toward the opposite end of the tubular member 16. The reflected light beam 23, in attempting to reach its focal point 26, must be directed to the divergent lens 28 and upon reaching the lens 28 the ray 23 will be refracted into a path parallel to the longitudinal axis 22 of the laser arrangement 10 in a direction toward the opposite end 20 of the tubular portion 16. The beam passing through the lens 28 will be transmitted against the second mirror 38 and reflected toward the second mirror's focal point 40 which is past the divergent lens 28 on the first mirror's 24 side thereof. The beam so reflected will be refracted by the divergent lens 28 and such beam will be more substantially parallel to the longitudinal axis of the tubular portion of the laser arrangement.

It should be noted that the first and second mirrors 24, 38, have a parabolic shape, using Cartesian coordinates, in the X and Y plane and having its focal point in coincidence with the focal point of the concave surface facing the mirror at the opposite end of the laser arrangement. In this manner resonating parallel light striking the parabolic surface of the first mirror 24 will be directed toward the focal point of the divergent lens surface. However, the refracted light will not converge to the focal point because of the divergent lens configuration. The beam 23, therefore, will strike the speculum surface of the second mirror and will be reflected back toward the focal point of the second mirror which point coincides with the focal point of the second concave surface on the divergent lens. In this manner the light rays so reflected back and forth will be changed from a rectangular configuration to a thin flat planar configuration.

The movement of the beam herein above described serves to concentrate the light rays against the rays which will always approach the center axis of the tubular arrangement. The emission from this type of laser will be in one plane thereby forming a planar laser beam.

While in accordance with the patent statutes, a preferred embodiment has been described in detail, it should be understood that the invention is not limited thereto or thereby.

I claim:

1. In a laser arrangement of the type including an elongated body having a longitudinal axis and two longitudinally spaced ends and containing an excitable medium in which light rays substantially parallel to the longitudinal axis are excited during the operation of the arrangement, reflected from two mirrors each arranged at one of the ends of the body, and eventually emitted through one of the ends of the body in the form of a laser beam, the improvement wherein each of the mirrors is concave and reflects all those light rays, which impinge upon the same in parallelism with the longitudinal axis, toward a focusing location situated in a focal plane passing through the longitudinal axis and spaced from the associated mirror more than a half of the distance between the mirrors; and further comprising a diverging lens positioned intermediate said focusing locations of the two mirrors and so configurated as to refract those light rays, which have been reflected from the mirrors toward the respective focusing locations, into a substantial parallelism with the longitudinal axis and closer to said focusing locations than the originally excited light rays.

2. The improvement according to claim 1 wherein each of the mirrors is parabolically shaped.

3. The improvement according to claim 2 wherein the focal locations of the two mirrors are congruent with the virtual focal locations of the diverging lens.

4. The improvement according to claim 3, wherein the mirrors and said lens are so configurated as to respectively reflect the axially parallel light rays toward, and refract the reflected light rays into parallelism with, said focusing plane in respective planes which are normal to said focusing plane to thereby give the laser beam a planar configuration.

* * * * *